United States Patent
Davydov et al.

(10) Patent No.: US 9,693,304 B2
(45) Date of Patent: Jun. 27, 2017

(54) RESCHEDULING OF A RESOURCE COMPONENT OF LOW POWER NODES (LPNS) IN A COORDINATION SET

(75) Inventors: Alexei Davydov, Nizhny Novgorod (RU); Gregory Morozov, Nizhny Novgorod (RU); Alexander Maltsev, Nizhny Novgorod (RU); Ilya Bolotin, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 317 days.

(21) Appl. No.: 13/997,256

(22) PCT Filed: May 14, 2012

(86) PCT No.: PCT/US2012/037715
§ 371 (c)(1),
(2), (4) Date: Apr. 21, 2014

(87) PCT Pub. No.: WO2013/048581
PCT Pub. Date: Apr. 4, 2013

(65) Prior Publication Data
US 2014/0226575 A1  Aug. 14, 2014

Related U.S. Application Data

(60) Provisional application No. 61/542,086, filed on Sep. 30, 2011.

(51) Int. Cl.
*H04W 16/16* (2009.01)
*H04W 72/12* (2009.01)
(Continued)

(52) U.S. Cl.
CPC ........ *H04W 52/0222* (2013.01); *H04B 7/024* (2013.01); *H04B 7/0417* (2013.01);
(Continued)

(58) Field of Classification Search
None
See application file for complete search history.

(56) References Cited

U.S. PATENT DOCUMENTS

2007/0293234 A1* 12/2007 Kim ............... H04W 28/06
455/455
2011/0143793 A1 6/2011 Kim
(Continued)

FOREIGN PATENT DOCUMENTS

KR  10-2011-0051096 A  5/2011
WO  2013/048581 A1  4/2013

OTHER PUBLICATIONS

Huawei, "The Synchronization Impacts Analysis on ICIC and MBSFN", 3GPP TSG-RAN WG4 R4-101730, May 2010, pp. 6, Meeting 55, Agenda 8.9.1, Montreal, Canada.
(Continued)

*Primary Examiner* — Hassan Phillips
*Assistant Examiner* — Duc Duong
(74) *Attorney, Agent, or Firm* — Thorpe North & Western

(57) ABSTRACT

A method for rescheduling a resource component of low power nodes (LPNs) in a local coordination set is disclosed. The method can include a local macro node receiving from a neighboring macro node a resource map of blanked resource components and scheduled resource components for physical resources of the neighboring macro node. The local macro node can be grouped with at least one low power node (LPN) within a local coordination set. The neighboring macro node can be grouped with at least one LPN within a neighboring coordination set. The neighboring macro node can be within a neighboring coordination set different from the local coordination set. The local macro node can reschedule using the resource map, a cell-edge resource component for LPNs in the local coordination set in a same
(Continued)

frequency-domain index and a same time-domain index as a blanked resource component of the neighboring macro node.

25 Claims, 8 Drawing Sheets

(51) Int. Cl.

| | |
|---|---|
| H04W 52/02 | (2009.01) |
| H04W 48/16 | (2009.01) |
| H04B 7/06 | (2006.01) |
| H04B 7/0456 | (2017.01) |
| H04L 12/891 | (2013.01) |
| H04W 52/04 | (2009.01) |
| H04L 5/00 | (2006.01) |
| H04W 72/04 | (2009.01) |
| H04W 4/08 | (2009.01) |
| H04W 36/00 | (2009.01) |
| H04W 28/04 | (2009.01) |
| H04W 4/06 | (2009.01) |
| H04W 72/00 | (2009.01) |
| H04W 76/04 | (2009.01) |
| H04L 12/709 | (2013.01) |
| H04W 48/18 | (2009.01) |
| H04W 72/08 | (2009.01) |
| H04W 76/06 | (2009.01) |
| H04B 7/024 | (2017.01) |
| H04B 7/0417 | (2017.01) |
| H04W 52/14 | (2009.01) |
| H04W 84/04 | (2009.01) |
| H04W 52/54 | (2009.01) |
| H04L 12/18 | (2006.01) |
| H04L 25/02 | (2006.01) |
| H04W 28/10 | (2009.01) |
| H04W 52/24 | (2009.01) |
| H04W 52/36 | (2009.01) |
| H04W 48/12 | (2009.01) |

(52) U.S. Cl.
CPC ......... *H04B 7/0456* (2013.01); *H04B 7/0615* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 28/042* (2013.01); *H04W 36/0005* (2013.01); *H04W 48/16* (2013.01); *H04W 48/18* (2013.01); *H04W 52/0235* (2013.01); *H04W 52/04* (2013.01); *H04W 52/146* (2013.01); *H04W 72/005* (2013.01); *H04W 72/042* (2013.01); *H04W 72/0446* (2013.01); *H04W 72/082* (2013.01); *H04W 72/1215* (2013.01); *H04W 72/1278* (2013.01); *H04W 72/1294* (2013.01); *H04W 76/048* (2013.01); *H04W 76/064* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02B 60/50* (2013.01)

(56) References Cited

U.S. PATENT DOCUMENTS

| | | | |
|---|---|---|---|
| 2011/0310830 A1* | 12/2011 | Wu | H04W 72/1289 370/329 |
| 2012/0057535 A1* | 3/2012 | Zhang | H04W 72/0426 370/329 |
| 2012/0120846 A1* | 5/2012 | Hwang | H04W 24/10 370/254 |
| 2012/0165034 A1* | 6/2012 | Boudreau | H04W 72/042 455/453 |
| 2013/0017852 A1* | 1/2013 | Liu | H04W 88/085 455/509 |
| 2013/0143614 A1* | 6/2013 | Lee | H04W 52/146 455/509 |
| 2013/0208677 A1* | 8/2013 | Lee | H04L 5/0094 370/329 |
| 2013/0223258 A1* | 8/2013 | Seo | H04W 24/02 370/252 |
| 2013/0223416 A1* | 8/2013 | Michel | H04W 16/14 370/336 |
| 2013/0329612 A1* | 12/2013 | Seo | H04J 11/0056 370/280 |
| 2014/0198744 A1* | 7/2014 | Wang | H04B 7/0617 370/329 |

OTHER PUBLICATIONS

Motorola Mobility, "Standardization Impact of CoMP Coordinated Scheduling Schemes", 3GPP TSG RAN1 R1-112442, Aug. 2011, pp. 6, Meeting 66, Agenda 6.5.2, Athens, Greece.
Search Report for European application 12837100.2 dated Sep. 21, 2015, 9 pages.
Texas Instruments, "System Performance Gains with Rel-10 ICIC and Het-Net Enhancements for Rel-11", 3GPP TSG RAN WG1 R1-112154, Aug. 2011, pp. 10, Meeting 66, Agenda 6.3.1, Athens, Greece.
LG Electronics,"Simulation Parameter Alignment for Phase 2 CoMP evaluation", 3GPP TSG-RAN WG1 Meeting # 65, R1-111630, Barcelona, Spain, May 9-13, 2011, 2 pages.
NTT DOCOMO, "CoMP Evaluation for Phase 2", 3GPP TSG-RAN WG1 Meeting # 65, R1-111935, Barcelona, Spain, May 9-13, 2011, 2 pages.
Technical Report 3rd Generation Partnership Project; Technical Specification Group Radio Access Network: Universal Terrestrial Radio Access (E-UTRA): Further advancements for E-UTRA physical layer aspects, 3GPP TR 36.814 V9.0.0, Release 9, Valbonne—France, Mar. 2010, pp. 1-104.
International Search Report and Written Opinion received for PCT application No. PCT/US2012/037715, mailed on Nov. 28, 2012, 11 pages.

* cited by examiner

RESCHEDULING OF A RESOURCE COMPONENT OF LOW POWER NODES (LPNS) IN A COORDINATION SET

RELATED APPLICATIONS

This application claims the benefit of and hereby incorporates by reference U.S. Provisional Patent Application Ser. No. 61/542,086, filed Sep. 30, 2011.

BACKGROUND

Wireless mobile communication technology uses various standards and protocols to transmit data between a transmission station and a wireless device. Some wireless devices communicate using orthogonal frequency-division multiplexing (OFDM) combined with a desired digital modulation scheme via a physical layer, Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device (e.g., mobile device), known as a user equipment (UE). A downlink (DL) transmission can be a communication from the transmission station (or eNodeB) to the wireless device (or UE), and an uplink (UL) transmission can be a communication from the wireless device to the transmission station.

In homogeneous networks, the transmission station, also called a macro node, can provide basic wireless coverage to wireless devices in a cell. The cell can be the area in which the wireless devices are operable to communicate with the macro node. Heterogeneous networks (HetNets) are used to handle the increased traffic loads on the macro nodes due to increased usage and functionality of wireless devices. HetNets can include a layer of planned high power macro nodes (or macro-eNBs) overlaid with layers of lower power nodes (micro-eNBs, pico-eNBs, femto-eNBs, or home eNBs [HeNBs]) that can be deployed in a less well planned or even entirely uncoordinated manner within the coverage area (cell) of a macro node. The lower power nodes can generally be referred to as "low power nodes". The macro node can be used for basic coverage, and the low power nodes can be used to fill coverage holes, to improve capacity in hot-zones or at the boundaries between the macro nodes' coverage areas, and improve indoor coverage where building structures impede signal transmission.

Inter-cell interference coordination (ICIC) or enhanced ICIC (eICIC) may be used for resource coordination to reduce interference between the transmission stations (or nodes), such as macro nodes and low power nodes. In ICIC, an interfering node (referred to as an aggressor node) may give up use of some resources in order to enable control and data transmissions between a low power node (referred to as a victim node) and a wireless device affected by interference from the aggressor node (referred to as a victim device). The transmission stations, such as the macro nodes and/or lower power nodes (LPN), can also be grouped together with other transmission stations in a Coordinated MultiPoint (CoMP) system where transmission stations from multiple cells can transmit signals to the wireless device and receive signals from the wireless device.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
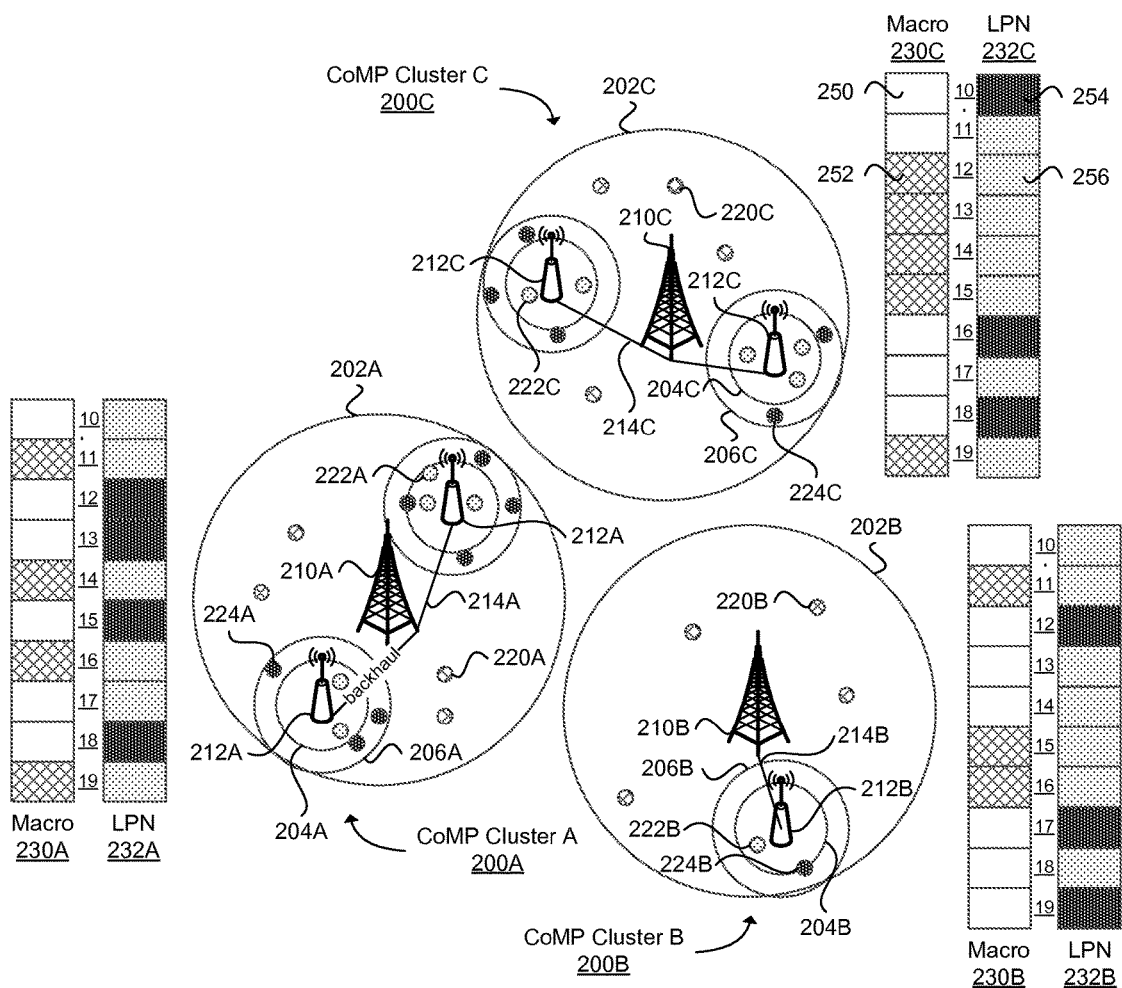
FIG. 1 illustrates a diagram of a plurality of coordination sets each with a macro node and a low power node (LPN) and physical resources for each macro node and the LPNs in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates a heterogeneous network (HetNet) with high power macro nodes 210A-C (e.g., macro-eNB) with a backhaul communication link 214A-C connected with low power nodes (LPNs) 212A-C (e.g., micro-eNBs, pico-eNBs, femto-eNBs, home eNBs [HeNBs], remote radio head [RRH], or relay node), Each macro node can transmit to wireless devices in a specified sector 202A-C. Each macro node and LPN can be included in a coordination set (e.g., a Coordinated MultiPoint (CoMP) duster 200A-C). A heterogeneous network (HetNet) can include a macro node and at least one low power node (LPN). The macro node can be grouped with the at least one LPN in a coordination set (or CoMP duster). The macro node can provide inter-cell interference coordination (ICIC), enhanced ICIC (eICIC), or coordinated multi-point (CoMP) transmission for the LPNs (or other macro nodes) in the coordination set. The macro node may not provide ICIC, eICIC, or CoMP for the LPNs or other macro nodes outside the coordination set.

HetNets can be used to optimize performance particularly for unequal user or traffic distribution and improve spectral efficiency per unit area of a cell. HetNets can also achieve significantly improved overall capacity and cell-edge performance. Enhanced inter-cell interference coordination (eICIC) can be used to coordinate resources between the macro nodes and the LPNs in their respective coordination set in the HetNet and reduce interference.

For example, due the high signal power of the macro node relative to the LPN, a transmission of a downlink subframe of a radio frame (or other resource component) by the macro node can generate strong interference to a downlink subframe transmission by an LPN to a wireless device on a substantially same carrier frequency in a time-division duplex (TDD) configuration. When the wireless device 222A-C is within a cell range 204A-C, the interference may be minimal relative to the transmitted signal and the interference can be resolved with interference mitigation processes at the LPN or the wireless device. The interference can be more substantial when the wireless device 224A-C is communicating with the LPN in a static or dynamic cell range expansion (CRE) region 206A-C further away from the LPN and not within the cell range. The interference may hinder the wireless device from demodulating and/or decoding the downlink subframe without significant errors.

In another example, the interference may hinder the LPN from correctly demodulating and/or decoding an uplink subframe of an uplink transmission from the wireless device. Although the interference is described in relation to a subframe, any type of resource component, such as a radio frame, a radio subframe, a slot, a frequency carrier, a frequency subcarrier, a physical resource block (PRB) may also experience interference, especially in an asymmetric TDD configuration. In order to mitigate the interference by the macro node on the wireless devices in the CRE region and on the LPNs communicating with the CRE region wireless devices, the macro node can mute transmission during a resource component (e.g., a subframe) when the LPN is communicating with wireless devices in the CRE region. The resource component (e.g., physical resource component) can be associated with a time interval and frequency carrier or subcarrier. The resource component can include a radio frame, a radio subframe, a slot, a frequency carrier, a frequency subcarrier, or a physical resource block (PRB). The muted transmission for a resource component can be referred to as a blanked resource component. A resource component available for transmission can be referred to as a scheduled resource component. Muting transmissions and using blanked resource components and scheduled resource components can be used in a dynamic point selection/dynamic point blanking (DPS/DPB) CoMP process.

Depending on the traffic conditions, DPS/DPB allows dynamic offloading of traffic from the macro node to a LPN in a coordination set (e.g., CoMP cluster). The traffic offloaded in DPS/DPB can be achieved by adaptive reselection of a serving point (e.g., from a macro node [or macro layer] to a LPN [or low power layer]) and applying resource blanking (e.g., on macro node or macro layer) to suppress interference. DPS/DPB can be a dynamic extension of the semi-static CRE process and time domain eICIC process. The scheduling for DPS/DPB can be conducted in centralized manner simultaneously for the macro node and the LPNs within one coordination set (e.g., CoMP cluster).

Neighboring macro nodes in a neighboring coordination set can also generate interference on LPNs and wireless devices in local coordination set. A resource map including the schedule of blanked resource components can be generated by a neighboring macro node and transmitted to a local macro node. The local macro node can reschedule resource components associated with transmission between LPNs and wireless devices in a CRE region (and other wireless device adversely affected by interference from nodes in a neighboring coordination set) based on the resource map from the neighboring macro node. Rescheduling resource components at a local macro node for LPNs in a local coordination set can mitigate the effects of the interference from neighboring coordination set.

The following provides additional details of the examples. FIG. 1 illustrates a diagram of a plurality of coordination sets 200A-C each with a macro node 210A-C and a low power node (LPN) 212A-C and physical resources for each macro node and the LPNs. FIG. 1 can represent a CoMP system employing DPS/DPB, which can include at least three types of different users. The different types of users can include macro users 220A-C served in non-CoMP mode, pico users 222A-C served in non-CoMP mode, and pico users 224A-C served in DPS/DPB CoMP mode with adaptive pico point selection and macro node blanking.

A macro user 220A-C can be a wireless device that communicates directly with the macro node (i.e., does not receive data transmissions from the LPN). Non-CoMP mode can refer to scheduling the macro node's resource components at a same frequency-domain index and a same time-domain index as a LPN's resource components.

A macro user's schedule 230A-C of resource components 10-19 for each of the macro nodes 210A-C can include scheduled resource components 252 (in non-CoMP mode) and blanked resource components 250 (for macro node blanking in DPS/DPB CoMP mode). The pico user 222A-C in non-CoMP mode can be a wireless device within the cell range 204A-C that communicates with the LPN. The pico user 224A-C in DPS/DPB CoMP mode can be a wireless device within the CRE region 206A-C that communicates with the LPN.

Non-CoMP mode can refer to scheduling the LPN's resource components at a same frequency-domain index and a same time-domain index as a macro node's resource components. DPS/DPB CoMP mode can refer to scheduling the LPN's resource components at a same frequency-domain index and a same time-domain index as a macro node's blanked resource components (e.g., muted transmission).

A pico user's schedule 232A-C of resource components 10-19 for each of the LPNs 212A-C can include non-CoMP mode scheduled resource components 256 and DPS/DPB CoMP mode scheduled resource components 254 (e.g., a cell-edge resource component). The DPS/DPB CoMP mode scheduled resource components can include resource components for pico users both in non-CoMP mode and DPS/DPB CoMP mode. The macro user and the pico user can be scheduled within a coordination set. The blanked resource components of the macro node can be scheduled at a same frequency-domain index and a same time-domain index as a cell-edge resource component (e.g., a resource component for a pico user in DPS/DPB CoMP mode).

For illustration and referencing purposes, a macro node can be referred to as a local macro node 210A. The local macro node can be associated with local LPNs 212A within a same coordination set, referred to as a local coordination set 200A. The macro nodes outside the local coordination set can be referred to as neighboring macro nodes 210B-C. The LPNs outside the local coordination set can be referred to as neighboring LPNs 212B-C. The local coordination set can be different from a neighboring coordination set 200B-C. Scheduling and coordinating of the macro node resource components 230A-C relative to the LPN resource components 232A-C can be performed separately for each coordination set 200A-C.

In the example shown in FIG. 1, scheduling information (e.g., resource map) including the macro node resource components 230A-C and the LPN resource components 232A-C for each coordination set can be different from the scheduling information of the other coordination sets. A DPS/DPB CoMP system can offload traffic from a macro layer (e.g., a macro node) by dynamic user re-association to a pico layer (e.g., a LPN) and use resource blanking to suppress interference from the macro layer of the same coordination set (e.g., CoMP cluster). Interference from macro layer of the neighboring coordination sets may not be suppressed due to independent scheduling decisions between coordination sets.

To reduce the interference from neighboring macro nodes in neighboring coordination sets, scheduling information of a local macro node can be exchanged with scheduling information of neighboring macro nodes via a backhaul communication link (216 of FIG. 4), such as an X2 interface, prior to the transmission of the resource components to the wireless devices. The backhaul communication link can be connected between macro nodes in different coordination sets. Alternatively, the backhaul communication link can be between any node of the local coordination set and any node of the neighboring coordination set. The exchange of scheduling information, such as a resource map can increase the robustness of the scheduling decisions for CoMP users on the pico layer.

For example, the scheduling information 230A-C on the macro layer of each coordination set can be encoded in the form of a resource map. The resource map can include a data structure, such as a bit array, a bitmap, a bitset, a bitstring, a data array, a list, a string, a table, and combinations of these data structures.

Figure 2:
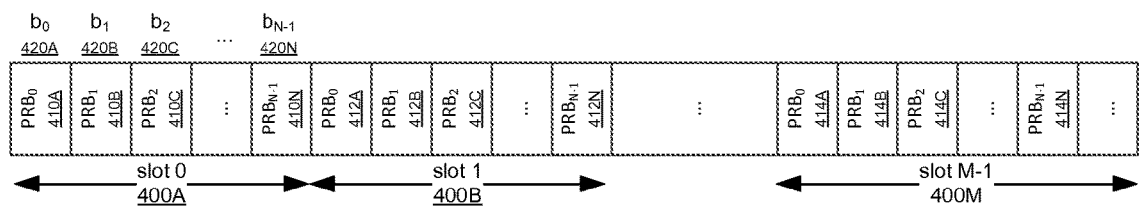
FIG. 2 illustrates a resource map for physical resource blocks (PRB) in accordance with an example.

In an example, the resource map includes a bitmap, and each resource component is represented by a bit, as illustrated in FIG. 2. The bitmap can be exchanged with the neighboring coordination sets. Each element (e.g., bit 420A-C and 420N) of the bitmap can indicate scheduling decision, such as a digital "0" for a blanked resource component and a digital "1" for a scheduled resource component. The resource component can be each PRB 410A-C, 410N, 412A-C, 412N, 414A-C, and 414N of each slot 400A-B and 410M in a radio frame. The blanked resource components (or substantially blanked resource components) and the scheduled resource components can include a radio frame, a radio subframe, a slot, a frequency carrier, a frequency subcarrier, a physical resource block (PRB), or combinations of these resource components.

Figure 3:
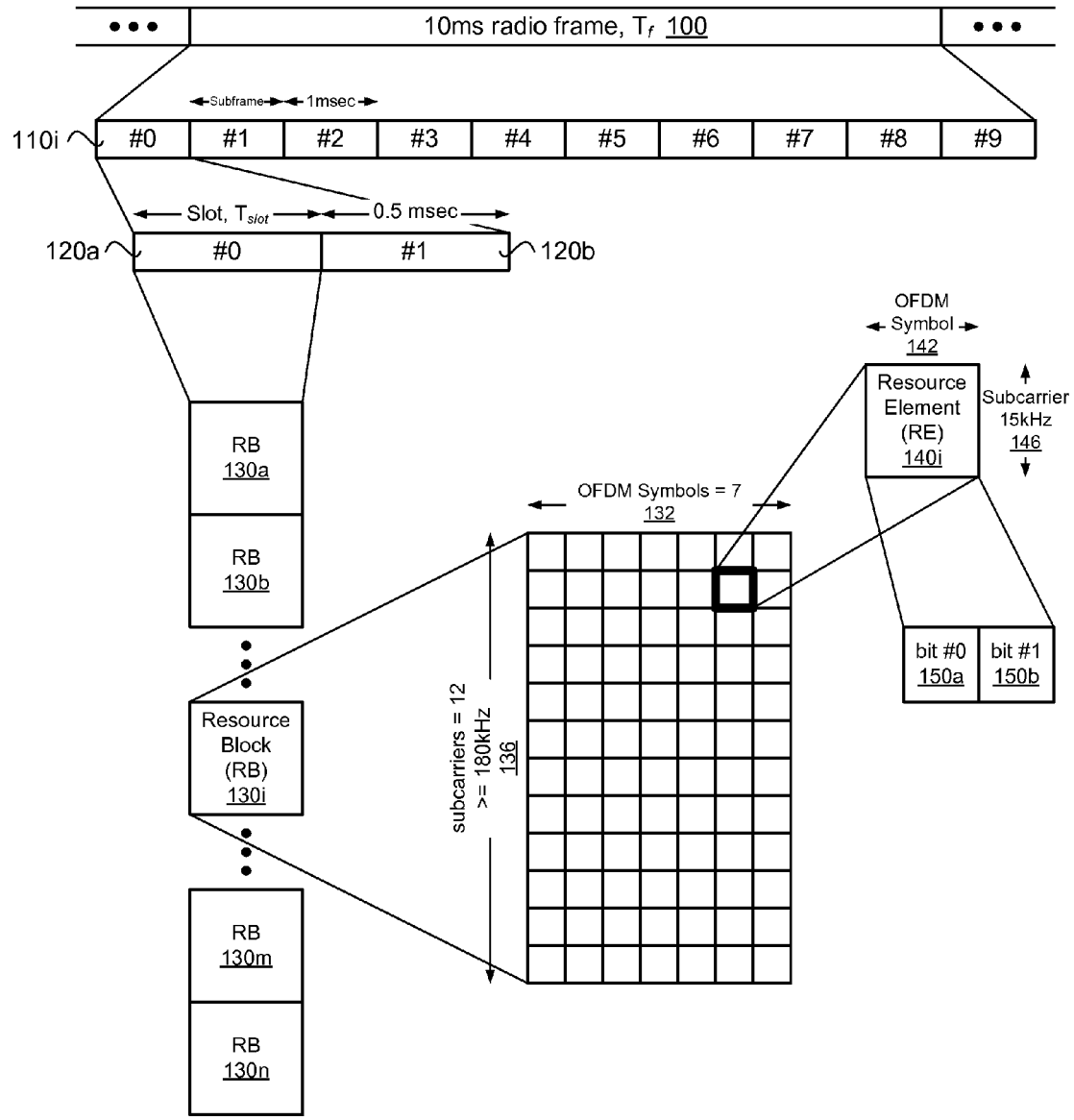
FIG. 3 illustrates a block diagram of radio frame resources in accordance with an example.

In one example, the resource components can represent elements of a radio frame structure transmitted on the physical (PHY) layer in a downlink transmission or uplink transmission between a node or a transmission station (or eNodeB) and the wireless device (or UE) using a generic long term evolution (LTE) frame structure, as illustrated in FIG. 3. While an LTE frame structure is illustrated, a frame structure for an IEEE 802.16 standard (WiMax), an IEEE 802.11 standard (WiFi), or another type of communication standard using OFDM may also be used. An uplink transmission may have a similar frame structure to the downlink transmission used in to transmit uplink information from the wireless device to a node.

FIG. 3 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration. $T_{slot}$, of 0.5 ms. Each slot for a component carrier (CC) used by the transmitting station and the receiving station can include multiple resource blocks (RBs) 130$a$, 130$b$, 130$i$, 130$m$, and 130$n$ based on the CC frequency bandwidth. The CC can have a carrier frequency having a bandwidth and center frequency. Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 4:
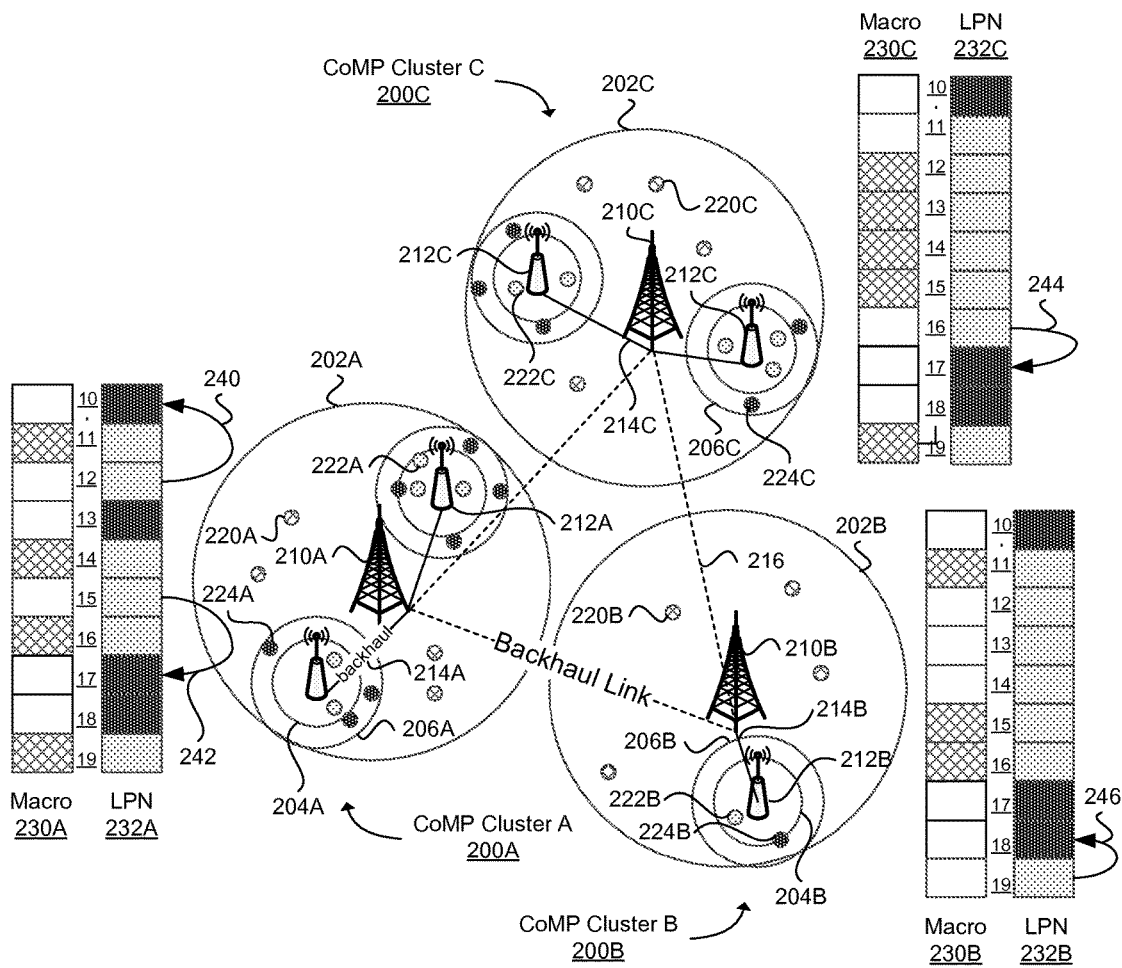
FIG. 4 illustrates a diagram of a plurality of coordination sets each with a macro node and a low power node (LPN) and rescheduling of physical resources for the LPNs in accordance with an example.

FIG. 4 illustrates rescheduling of component resources for the LPNs based on the resource maps 230B-C received from neighboring macro nodes 210B-C. Based on the resource maps received from neighboring macro nodes and the scheduling information 230A of the local macro node 210A on the macro layer, an interference protection level for each resource can be identified. The resource map can be received by a local macro node via a backhaul link 216. Since resource components 10, 17, and 18 are blanked resource components for the local macro node and the neighboring macro nodes, the blanked resource components 10, 17, and 18 can have a high interference protection level, which can be used to schedule pico users (including pico users in DPS/DPB CoMP mode) with interference sensitivity to neighboring macro nodes. The interference protection level as well as a sensitivity of user performance to macro layer interference from a neighboring coordination set can be utilized to improve scheduling decisions on the pico layer, thus providing additional robustness in the performance of CoMP DPS/DPB users (e.g., pico user in DPS/DPB mode) against neighboring node interference. In one example, a sensitivity of user performance can be obtained by comparing a reference signal (RS) measurement of signal interference (e.g., a reference signal received power (RSRP), a reference signal received quality (RSRQ), or combination of RSRP and RSRQ) of different nodes against a specified criteria. Other types of sensitivity measurements may also be performed.

For example in the CoMP cluster A 200A, the cell-edge resource component (e.g., the DPS/DPB CoMP mode scheduled resource component) at a resource component location 12 can be rescheduled to a resource component location 10 to increase an interference protection level for the pico user in a DPS/DPB CoMP mode. The non-CoMP mode scheduled resource component in the resource component location 10 (replaced by the cell-edge resource component) can be rescheduled 240 to the resource component location 12. So effectively, the cell-edge resource component exchanges resource component locations with non-CoMP mode scheduled resource component, which may be less susceptible to a neighboring macro node interference or a node in a neighboring coordination set.

Likewise, the cell-edge resource component at a resource component location 15 can be rescheduled 242 and exchanged with the non-CoMP mode scheduled resource component in resource component location 17. Existing cell-edge resource component in a high interference protection level location 18 of 332A can remain without rescheduling. In an example with the CoMP cluster B 200B, the cell-edge resource component at a resource component location 19 can be rescheduled 246 and exchanged with the non-CoMP mode scheduled resource component in resource component location 18. In an example with the CoMP cluster C 200C, the cell-edge resource component at a resource component location 16 can be rescheduled 244 and exchanged with the non-CoMP mode scheduled resource component in resource component location 17.

The scheduling information exchange between a coordination set (e.g., CoMP cluster) can provide coordination set scheduling coordination between neighboring coordination sets, so CoMP users can be rescheduled to the component resources with high interference protection, where blanking decisions on different CoMP clusters are the same.

A HetNet (and homogeneous network) can include regular (planned) placement of macro nodes 210A-C that can typically transmit at high power level, for example, approximately 5 watts (W) to 40 W, to cover the macro sector 202A-C. The HetNet can be overlaid with low power nodes (LPNs) 212A-C, which may transmit at substantially lower power levels, such as approximately 100 milliwatts (mW) to 2 W.

Figure 5:
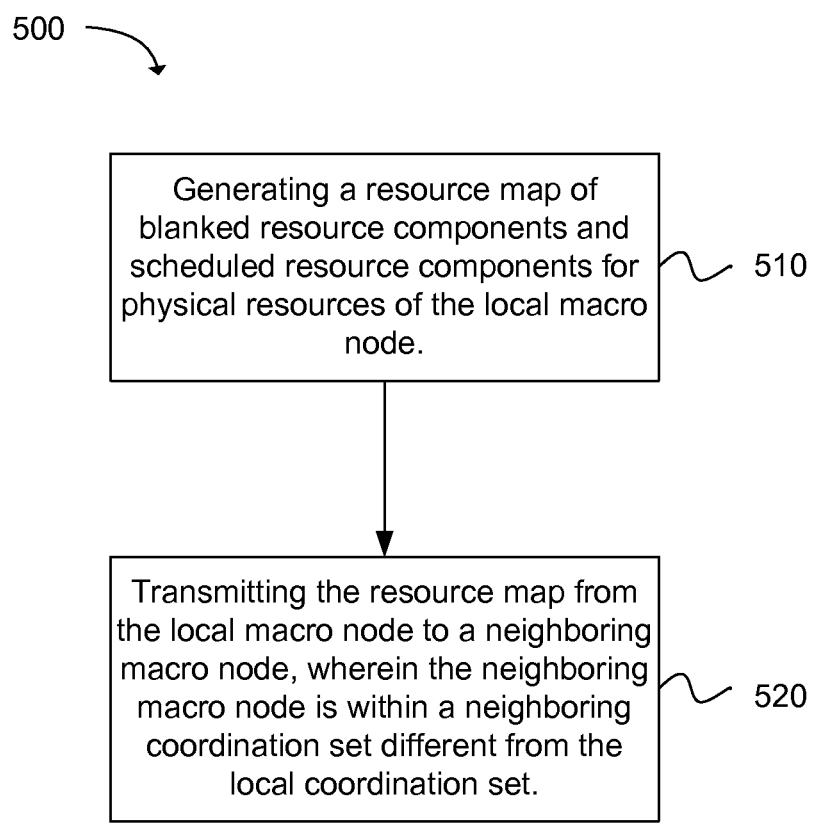
FIG. 5 depicts a flow chart of a method for transmitting a resource map of a local macro node to a neighboring macro node in a Coordinated MultiPoint (CoMP) system in accordance with an example.

Another example provides a method 500 for transmitting a resource map of a local macro node to a neighboring macro node in a Coordinated MultiPoint (CoMP) system, as shown in the flow chart in FIG. 5. The method includes the operation of generating a resource map of blanked resource components and scheduled resource components for physical resources of the local macro node, as in block 510. The operation of transmitting the resource map from the local macro node to a neighboring macro node, wherein the neighboring macro node is within a neighboring coordination set different from the local coordination set follows, as in block 520.

The local macro node can be grouped with at least one low power node (LPN) within a local coordination set. The method can further include the local macro node scheduling the blanked resource components for a local macro node for a same frequency-domain index and a same time-domain index as a cell-edge resource component for LPNs in the local coordination set. In another embodiment, the method can further include the neighboring macro node rescheduling using the resource map, a cell-edge resource component for LPNs in the neighboring coordination set in a same frequency-domain index and a same time-domain index as a blanked resource component of the local macro node. The neighboring macro node can be grouped with at least one LPN within the neighboring coordination set. The resource map can include a bit array, a bitmap, a bitset, a bitstring, a data array, a list, a string, a table, or combination of these data structures. The blanked resource components and the scheduled resource components can include a radio frame, a radio subframe, a slot, a frequency carrier, a frequency subcarrier, a physical resource block (PRB), and combinations of these resource components. The operation of transmitting the resource map from the local macro node to a neighboring macro node can include X2 signaling or backhaul link signaling via a wired connection, a wireless connection, or an optical fiber connection.

Figure 6:
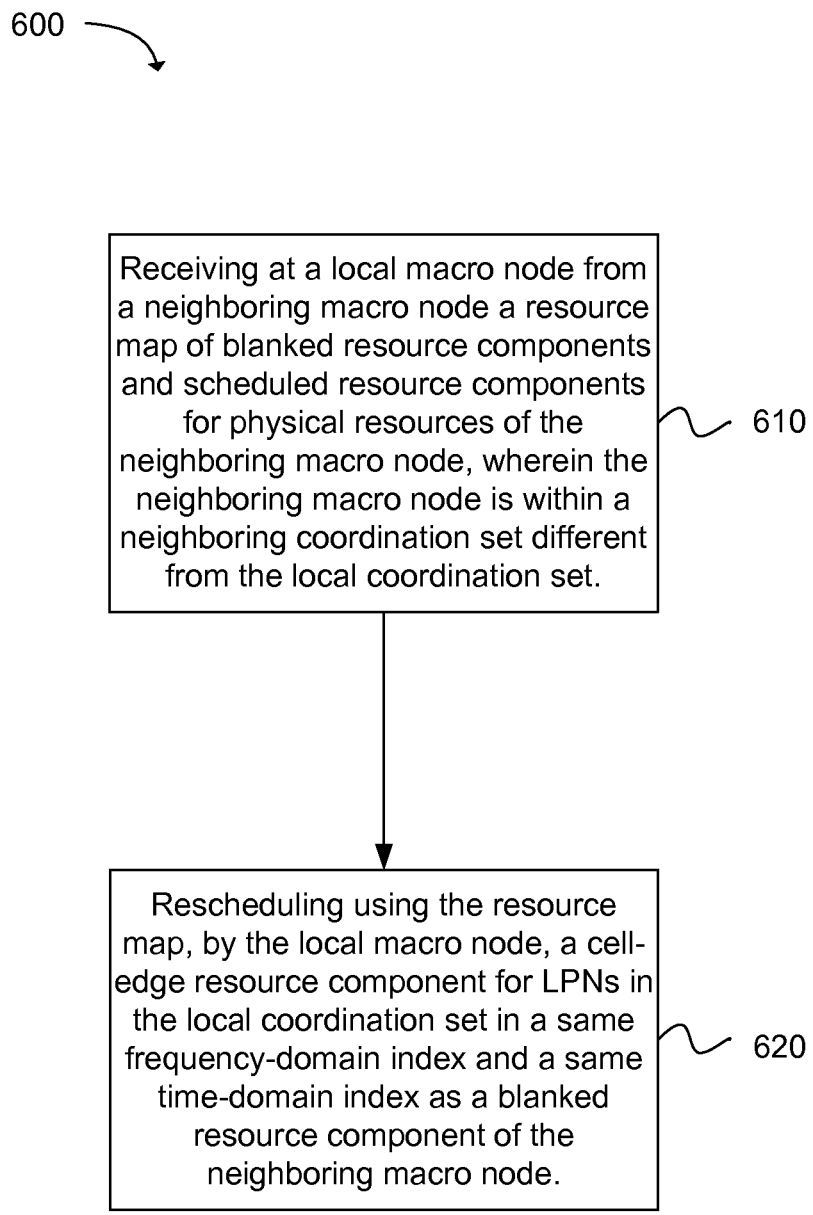
FIG. 6 depicts a flow chart of a method for rescheduling a resource component of low power nodes (LPNs) in a local coordination set in accordance with an example.

Another example provides a method 600 for rescheduling a resource component of low power nodes (LPNs) in a local coordination set, as shown in the flow chart in FIG. 6. The method includes the operation of receiving at a local macro node from a neighboring macro node a resource map of blanked resource components and scheduled resource components for physical resources of the neighboring macro node, wherein the neighboring macro node is within a neighboring coordination set different from the local coordination set, as in block 610. The operation of rescheduling using the resource map, by the local macro node, a cell-edge resource component for LPNs in the local coordination set in a same frequency-domain index and a same time-domain index as a blanked resource component of the neighboring macro node follows, as in block 620.

The local macro node is grouped with at least one low power node (LPN) within a local coordination set, and the neighboring macro node is grouped with at least one LPN within a neighboring coordination set. The method can further include the local macro node receiving from a LPN within the local coordination set or directly from a wireless device a reference signal (RS) measurement of signal interference on the wireless device within a cell-edge of the LPN. The RS measurement can include signal interference from scheduled resource components of the neighboring macro node. The operation of rescheduling the cell-edge resource component for LPNs in the local coordination set can further include rescheduling the cell-edge resource component for LPNs in the local coordination set when the RS measurement satisfies a specified criteria. The RS measurement can include a reference signal received power (RSRP), a reference signal received quality (RSRQ), and combination these RS measurements.

In another embodiment, the method can further include the neighboring macro node rescheduling, using the resource map, a cell-edge resource component for LPNs in the neighboring coordination set in a same frequency-domain index and a same time-domain index as a blanked resource component of the local macro node. The neighboring macro node can be grouped with at least one LPN within the neighboring coordination set. The resource map can include a bitmap, and each resource component can be represented by a bit. In another embodiment, the resource map can include a bit array, a bitmap, a bitset, a bitstring, a data array, a list, a string, a table, or combination of these data structures. The blanked resource components and the scheduled resource components can include a radio frame, a radio subframe, a slot, a frequency carrier, a frequency subcarrier, a physical resource block (PRB), and combinations of these resource components. The operation of transmitting the resource map from the local macro node to a neighboring macro node can include X2 signaling or backhaul link signaling via a wired connection, a wireless connection, or an optical fiber connection.

Figure 7:
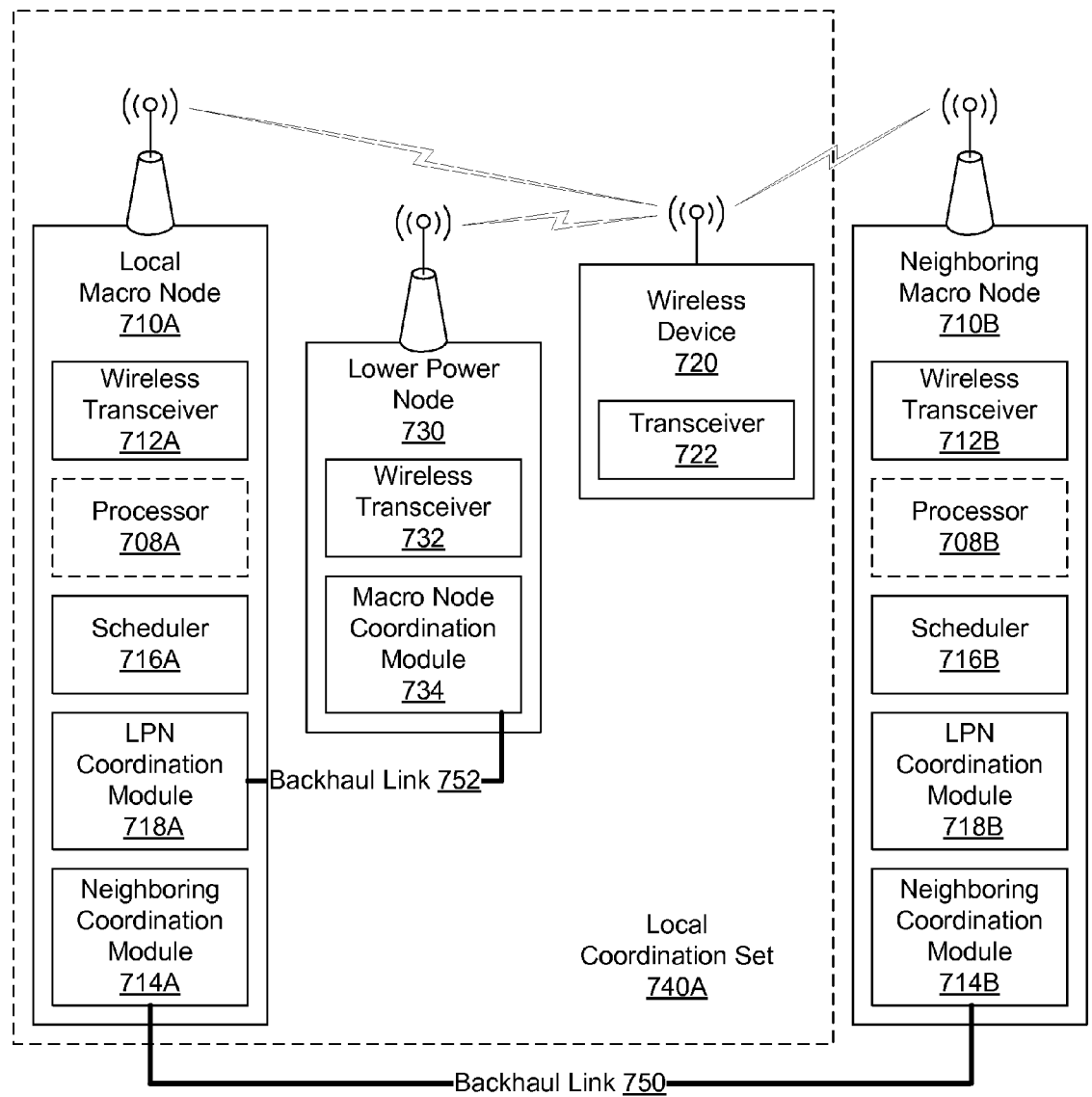
FIG. 7 illustrates a block diagram of a local macro node, a low power node (LPN), a wireless device, and a neighboring macro node in accordance with an example.

FIG. 7 illustrates example nodes and an example wireless device 720 in a heterogeneous network (HetNet). The nodes can include a macro node (e.g., macro-eNB) or a low power node 730 (e.g., micro-eNB, a pico-eNB, a femto-eNB, or a HeNB). The macro nodes can include a local macro node 710A and a neighboring macro node 710B. The local macro node can have a local coordination set including at least one low power node (LPN). The neighboring macro node can have a neighboring coordination set including at least one LPN (not shown).

Each macro node can include a neighboring coordination module 714A and 714B, a scheduler 716A and 716B, a LPN coordination module 718A and 718B, a wireless transceiver 712A and 712B, and a processing module or processor 708A and 708B. The neighboring coordination module 714A and 714B can be configured to communicate a resource map via a backhaul link 750 with a neighboring macro node 710B within a neighboring coordination set different from a local coordination set 740A. The resource map can include blanked resource components and scheduled resource components for physical resources of the macro node.

The scheduler 716A and 716B can be configured to schedule resource components for the macro node and the LPNs and reschedule a cell-edge resource component for LPNs in the local coordination set based on a received resource map from the neighboring macro node. The LPN coordination module 718A and 718B can be configured to communicate coordination set information with at least one LPN within the coordination set. The coordination set information can include the blanked resource components, the scheduled resource components, or the resource map for the at least one LPN having coordinated signaling with the macro node. The coordination set information can be transmitted from the LPN coordination module 718A in the macro node 710A to a macro node coordination module 734 in the LPN 730 via a backhaul link 752.

The backhaul link 750 and 752 can include X2 signaling or backhaul link signaling via a wired connection, a wireless connection, or an optical fiber connection. The wireless transceiver 712A and 712B can be configured to communicate with a wireless device and receive a reference signal (RS) measurement from the wireless device. The processing module or processor 708A and 708B can be configured for implementing an inter-cell interference coordination (ICIC), an enhanced inter-cell interference coordination (eICIC), coordinated multi-point (CoMP), or combination of these HetNet interference coordination processes for the nodes in the coordination set or between coordination sets.

The LPN 730 can include a wireless transceiver 732 and a macro node coordination module 734. The wireless transceiver of the LPN can be configured to transmit coordination set information to a wireless device and transmit a request to the wireless device in the HetNet to apply a specified reference signal (RS) biasing to a LPN RS measurement derived from a LPN RS received from the at least one LPN in the coordination set. The coordination set information can include a LPN identifier for the at least one LPN having coordinated signaling with the macro node. The macro node coordination module can be configured to communicate coordination set information with the macro node via the backhaul link 752.

The wireless device 720 (e.g., UE) can be in communication with the local macro node 710A or the LPN 730 and receive interference from the neighboring macro node 710B. In an example, an available transmission power of the macro node may be at least ten times an available transmission power of the LPN. The wireless device can include a transceiver 722. The transceiver of the wireless device can be configured to receive DL transmission information from the nodes and transmit UL transmission information to the nodes. The UL transmission information can include a RS measurement including a RSRP or a RSRQ.

Figure 8:
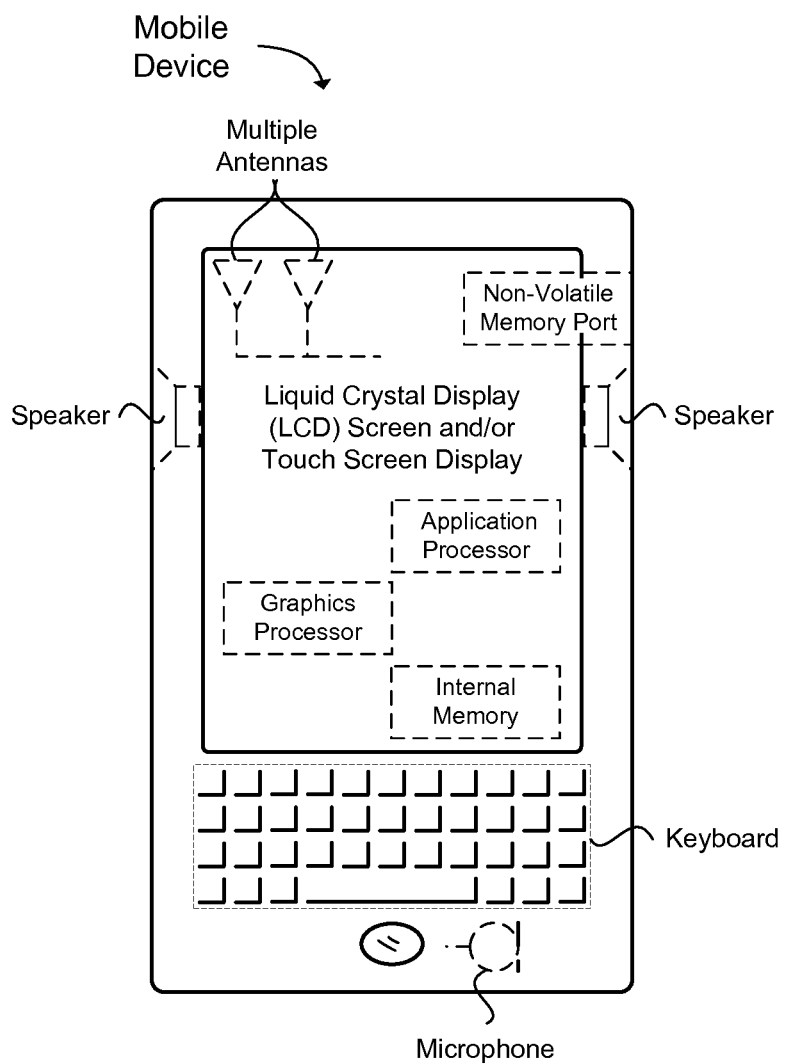
FIG. 8 illustrates a diagram of a wireless device in accordance with an example.

FIG. 8 provides an example illustration of the wireless device, such as a user equipment (UE), a mobile station (MS), a mobile wireless device, a mobile communication device, a tablet, a handset, or other type of mobile wireless device. The wireless device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Rescheduling the component resources with high interference protection can mitigate the effects of interference by neighboring macro nodes in neighboring coordination set and improve the efficiency of the HetNets and CoMP systems.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer program product, comprising a non-transitory computer readable storage medium having a computer readable program code embodied therein, the computer readable program code adapted to be executed to implement a method for transmitting a resource map of a local macro node to a neighboring macro node in a Coordinated Multipoint (CoMP) system, comprising:
   generating a resource map of the blanked resource components and scheduled resource components for physical resources of the local macro node;
   transmitting the resource map from the local macro node to the neighboring macro node, wherein the neighboring macro node is within a neighboring coordination set different from a local coordination set; and
   scheduling blanked resource components for the local macro node for a same frequency-domain index and a same time-domain index as a cell-edge resource component for lower power nodes LPNs in the local coordination set.

2. The computer program product of claim 1, further comprising:
   rescheduling using the resource map, by the neighboring macro node, a cell-edge resource component for LPNs in the neighboring coordination set in a same frequency-domain index and a same time-domain index as a blanked resource component of the local macro node, wherein the neighboring macro node is grouped with at least one LPN within the neighboring coordination set.

3. The computer program product of claim 1, wherein transmitting the resource map from the local macro node to a neighboring macro node includes X2 signaling or backhaul link signaling via a wired connection, a wireless connection, or an optical fiber connection.

4. The computer program product of claim 1, wherein the resource map includes a bitmap, and each resource component is represented by a bit.

5. The computer program product of claim 1, wherein the resource map is selected from the group consisting of a bit array, a bitmap, a bitset, a bitstring, a data array, a list, a string, a table, and combinations thereof.

6. The computer program product of claim 1, wherein the blanked resource components and the scheduled resource components are selected from the group consisting of a radio frame, a radio subframe, a slot, a frequency carrier, a frequency subcarrier, a physical resource block (PRB), and combinations thereof.

7. The computer program product of claim 1, wherein the local macro node is grouped with at least one low power node (LPN) within a local coordination set.

8. The computer program product of claim 1, wherein the neighboring macro node is grouped with at least one LPN within a neighboring coordination set.

9. A computer program product, comprising a non-transitory computer readable storage medium having a computer readable program code embodied therein, the computer readable program code adapted to be executed to implement a method for rescheduling a resource component of low power nodes (LPNs) in a local coordination set, comprising:
  receiving at a local macro node from a neighboring macro node a resource map of blanked resource components and scheduled resource components for physical resources of the neighboring macro node, wherein the neighboring macro node is within a neighboring coordination set different from the local coordination set; and
  rescheduling using the resource map, by the local macro node, a cell-edge resource component for LPNs in the local coordination set in a same frequency-domain index and a same time-domain index as a blanked resource component of the neighboring macro node.

10. The computer program product of claim 9, further comprising:
  receiving at a local macro node from a LPN within the local coordination set or directly from a wireless device a reference signal (RS) measurement of signal interference on the wireless device within a cell-edge of the LPN, including signal interference from scheduled resource components of the neighboring macro node; and
  wherein rescheduling the cell-edge resource component for LPNs in the local coordination set further includes rescheduling the cell-edge resource component for LPNs in the local coordination set when the RS measurement satisfies a specified criteria.

11. The computer program product of claim 10, wherein the RS measurement is selected from the group consisting of a reference signal received power (RSRP), a reference signal received quality (RSRQ), and combinations thereof.

12. The computer program product of claim 9, wherein receiving at a local macro node from a neighboring macro node the resource map includes X2 signaling or backhaul link signaling via a wired connection, a wireless connection, or an optical fiber connection.

13. The computer program product of claim 9, wherein the resource map includes a bitmap, and each resource component is represented by a bit.

14. The computer program product of claim 9, wherein the resource map is selected from the group consisting of a bit array, a bitmap, a bitset, a bitstring, a data array, a list, a string, a table, and combinations thereof.

15. The computer program product of claim 9, wherein the blanked resource components and the scheduled resource components are selected from the group consisting of a radio frame, a radio subframe, a slot, a frequency carrier, a frequency subcarrier, a physical resource block (PRB), and combinations thereof.

16. The computer program product of claim 9, wherein the local macro node is grouped with at least one low power node (LPN) within a local coordination set.

17. The computer program product of claim 9, wherein the neighboring macro node is grouped with at least one LPN within a neighboring coordination set.

18. A macro node in a heterogeneous network (HetNet) having a local coordination set including at least one low power node (LPN), comprising:
  a neighboring coordination module configured to communicate a resource map with a neighboring macro node within a neighboring coordination set different from the local coordination set, wherein the resource map includes blanked resource components and scheduled resource components for physical resources of the macro node; and
  a scheduler configured to schedule blanked resource components for the macro node for a same frequency-domain index and a same time-domain index as a cell-edge resource component for LPNs in the local coordination set and reschedule the cell-edge resource component for the at least one LPN in the local coordination set based on a received resource map from the neighboring macro node.

19. The macro node of claim 18, further comprising:
  a LPN coordination module configured to communicate coordination set information with the at least one LPN within the coordination set, wherein the coordination set information includes at least one of the blanked resource components, the scheduled resource components, and the resource map for the at least one LPN having coordinated signaling with the macro node.

20. The macro node of claim 18, wherein the communication with the at least one LPN within the coordination set and communication with the neighboring macro node includes X2 signaling or backhaul link signaling via a wired connection, a wireless connection, or an optical fiber connection.

21. The macro node of claim 18, wherein the resource map is selected from the group consisting of a bit array, a bitmap, a bitset, a bitstring, a data array, a list, a string, a table, and combinations thereof.

22. The macro node of claim 18, wherein the blanked resource components and the scheduled resource components are selected from the group consisting of a radio frame, a radio subframe, a slot, a frequency carrier, a frequency subcarrier, a physical resource block (PRB), and combinations thereof.

23. The macro node of claim 18, further comprising:
  a wireless transceiver configured to communicate with a wireless device and receive a reference signal (RS) measurement from the wireless device, wherein the wireless device includes a user equipment (UE) with an antenna, a touch sensitive display screen, a speaker, a microphone, a graphics processor, an application processor, internal memory, a non-volatile memory port, or combinations thereof.

24. The macro node of claim 18, further comprising:
  a processing module configured for implementing an inter-cell interference coordination (ICIC), an enhanced inter-cell interference coordination (eICIC), coordinated multi-point (CoMP), or combination of thereof for the nodes in the coordination set.

25. The macro node of claim 18, wherein the macro node includes a macro evolved Node B (macro-eNB) and the LPN includes a micro-eNB, a pico-eNB, a femto-eNB, or a home eNB (HeNB).

* * * * *